United States Patent [19]

Kawamura

[11] Patent Number: 5,578,392
[45] Date of Patent: Nov. 26, 1996

[54] CYLINDRICAL CELL, A CELL PACK, AND A CELL HOLDER

[75] Inventor: Hiroshi Kawamura, Kyoto, Japan

[73] Assignee: Japan Storage Battery Co., Ltd., Kyoto, Japan

[21] Appl. No.: 600,294

[22] Filed: Feb. 12, 1996

[30] Foreign Application Priority Data

Feb. 17, 1995 [JP] Japan .................................. 7-053595
Apr. 18, 1995 [JP] Japan .................................. 7-117884

[51] Int. Cl.$^6$ ............................................... H01M 2/30
[52] U.S. Cl. ............................ 429/99; 429/159; 429/123; 429/178
[58] Field of Search .............................. 429/158–160, 429/123, 96, 99, 100, 211, 178

[56] References Cited

U.S. PATENT DOCUMENTS

| | | | |
|---|---|---|---|
| 1,723,727 | 8/1929 | Eckstein | 429/158 |
| 3,783,030 | 1/1974 | Tietze | 429/158 X |
| 4,581,306 | 4/1986 | Hasenauer et al. | 429/123 |
| 4,678,727 | 7/1987 | Kawakami et al. | 429/158 X |

*Primary Examiner*—Anthony Skapars
*Attorney, Agent, or Firm*—Popham Haik Schnobrich & Kaufman, Ltd.

[57] ABSTRACT

Connecting plates of a sufficiently large thickness can be respectively connected to terminals attached to positive and negative sides, respectively, thereby providing a cylindrical cell which is suitable for supplying a large current and a cell pack using the cylindrical cell.

A cell holder is provided in which upper and lower end portions of cylindrical cells are held by a pair of supporting members provided with a vent hole, thereby allowing heat generated from the cylindrical cells to be dissipated to the exterior via the vent hole.

In order to attain the objects, in a cylindrical cell, terminals are attached to the cover on the positive side and the bottom face of the case on the negative side, respectively. Each of the terminals consists of a face portion in which a female threaded hole is opened or a male threaded portion is erected, and legs which are formed by bending the four sides of the face portion. The legs are spot-welded to the cover and the bottom face of the case. A connecting member of a sufficiently large thickness is screwed by a bolt to the terminals. A part or whole of the connecting member is configured by a flexible material.

20 Claims, 13 Drawing Sheets

CYLINDRICAL CELL, A CELL PACK, AND A CELL HOLDER

BACKGROUND OF THE INVENTION

The invention relates to a cylindrical cell which has a cylindrical shape, to a cell pack in which a plurality of the cylindrical cells are connected to each other, and to a cell holder which holds in a bundle a plurality of sealed-type cells.

A nickel-cadmium cell and a nickel-metal hydride cell which are rechargeable are widely employed as a battery power source for a portable apparatus. Such a nickel-cadmium cell or a nickel-metal hydride cell is used mainly in the form of a cylindrical cell which has a cylindrical shape. In a portable apparatus, such a cylindrical cell is used singly or in the form of a cell pack in which a plurality of cells are connected.

As shown in FIG. 10, a cylindrical cell 1 has a structure in which one end of a cylindrical case 12 containing cell materials is closed by a cover 11 via a packing and then caulked. A projection 11a is formed in the cover 11, and a safety valve for releasing gasses is disposed in the projection 11a. In the cylindrical cell 1, generally, the cover 11 having the projection 11a is connected to a positive electrode, and the case 12 which covers the peripheral side face and the bottom face is connected to a negative electrode.

When the cylindrical cell 1 is to be used as a power source for an apparatus, generally, the cell is connected to a power source circuit in the following manner. As shown in FIG. 11, nickel plates 9 of a thickness of about 0.1 to 0.5 mm are spot-welded at one end to the projection 11a and the bottom face of the case 12, respectively. The cell is connected to the power source circuit through the nickel plates 9. When the cylindrical cell 1 is to be used in the form of a cell pack, generally, cells are connected to each other in the following manner. As shown in FIG. 12, two adjacent cells 1 are bridged by a nickel plate 9, and the both ends of the nickel plate are spot-welded to the projection 11a of the cover 11 of one of the cells and the bottom face of the case 12 of the other cell, respectively.

In the case where the cylindrical cell 1 must supply a large current, the resistances of the nickel plates 9 are not negligible, and hence the nickel plates are required to have a large thickness. When the nickel plates 9 have a large thickness, however, it is difficult to spot-weld the plates to the cylindrical cell 1. Therefore, the increase of the thickness of a plate has a limitation.

In the prior art, therefore, the voltage drop and heat generation in the nickel plates 9 are inevitably increased in magnitude when the cylindrical cell 1 supplies a large current, thereby producing a problem in that the cell performance cannot be sufficiently exerted.

A prior art cell holder has a structure such as that shown in Japanese Utility Model Publication (Kokai) No. SHO60-22752. In the cell holder, a plurality of cylindrical cells are arranged in such a manner that their peripheral side faces are adjacent to each other, a frame surrounds the periphery of the arranged cells, and a cover is attached to each of the end faces of the cylindrical cells. The frame consists of a side wall surrounding the periphery of the cells, and a number of partition walls which are inwardly projected from the side wall. The cylindrical cells are supported by inserting them into the spaces between the side wall and the partition walls, respectively. In some cases, a plurality of holes are formed in a block-like frame and cylindrical cells are respectively fitted into the holes, or alternatively a large hole having a shape which is obtained by coupling such holes to each other is formed and a plurality of cylindrical cells are fitted in a bundle into the hole. In the covers, elastic connecting plates are adequately disposed on the faces opposing the both end faces of the cylindrical cells in the frame, so that the cylindrical cells are electrically connected to each other.

In a cell pack using such a cell holder, when required, the peripheral side faces of the cylindrical cells may be covered by a film of a resin, or the like in order to ensure the electrical insulation between the cylindrical cells.

When a cell is discharged, heat is generated as a result of an internal electrochemical reaction and electric resistance. In the case of a heavy current drain, particularly, the amount of generated heat is increased. In a sealed-type secondary cell such as a nickel cadmium cell or a nickel-metal hydride cell, the heat generation occurs also when the cell is charged. When the temperature of the cell is raised as a result of the heat generation, self-discharge may reduce the cell capacity or shorten the service life of the cell. Therefore, it is previously determined that such a cell is used in a temperature range of −10° to 60° C. during a discharging process and 0° to 35° C. during a charging process.

In the prior art cell holder, however, each cylindrical cell is surrounded by the frame and the both ends are covered by the covers so that the interior of the holder is substantially hermetically sealed, and hence heat generated from the cylindrical cells during the discharging or charging process cannot be sufficiently dissipated to the exterior. This produces a problem in that the temperature of the cylindrical cells may be raised to a level higher than the specified range. This problem is also applicable to sealed-type cells of other types such as those of rectangular cells.

SUMMARY OF THE INVENTION

The invention has been conducted in view of the above-discussed circumstances. It is an object of the invention to enable connecting members of a sufficiently large thickness to be respectively connected to terminals, thereby providing a cylindrical cell which is suitable for supplying a large current and a cell pack using the cylindrical cell.

It is another object of the invention to provide a cylindrical cell which, in order to solve the above-discussed problems, comprises a cover connected to one electrode and a bottomed cylindrical case connected to the other electrode, and in which terminals made of an electrically conductive material and having a face portion where a female threaded hole is opened or a male threaded portion is erected are respectively fixedly connected to a cover and a bottom face of a case via legs which support the face portion.

It is a further object of the invention to provide a cylindrical cell in which tip ends of the legs of the terminals are formed into a flat-plate like shape, each of the flat portions of the legs is provided with at least one of a slit and a projection which is projected from a rear face of the flat portion, and the legs are fixedly connected by spot-welding the flat portions of the legs to the cover and the bottom face of the case.

It is a still further object of the invention to provide a cell pack in which a plurality of the cylindrical cells are arranged side-by-side, a connecting member in which bolt holes are opened at both end portions and which is made of an electrically conductive material is used, and bolts are respectively fitted into the both bolt holes of the connecting member and the bolts are fastened to female threaded holes which are opened in face portions of terminals of different cylindrical cells, or male threaded portions erected on face portions of terminals of different cylindrical cells are respectively fitted into the both bolt holes of the connecting member and nuts are respectively fastened to the male threaded portions, or a bolt is fitted into one of the bolt holes of the connecting member and the bolt is fastened to a female threaded hole which is opened in a face portion of a terminal of one of the cylindrical cells and a male threaded portion erected on a face portion of a terminal of another one of cylindrical cells is fitted into the other both bolt hole and a nut is fastened to the male threaded portion, thereby connecting the cylindrical cells with each other.

It is a still further object of the invention to provide a cell pack in which a part or whole of the connecting member which is made of an electrically conductive material is configured by a flexible material.

It is a still further object of the invention to provide a cell pack in which the cylindrical cells are held by a holder which causes the face portions of the terminals on each side of the cylindrical cells to be positioned in a substantially same plane.

According to the thus configured cylindrical cell, terminals are attached to the both ends of the cylindrical cell, respectively. In each of the terminals, a female threaded hole is opened or a male threaded portion is erected in the face portion. Consequently, an electrically conductive connecting member having a large sectional area can be screwed to the terminals by using bolts, nuts, or the like, so that cylindrical cells are assembled with a low resistance.

Both the flat portions which are formed by separating each of the legs by a slit are spot-welded to the cover or the bottom of the case of the cylindrical cell. In this case, since the welding current of a sufficient level flows between the two faces via the cover or the bottom of the case, the spot welding can be surely conducted. When projections projected from the rear faces of the flat portions are formed, the welding current can be sufficiently concentrated to the projections and hence the adhesion due to welding can be surely done.

In the case where the flat portion of each leg is provided with a slit and a projection is formed on the rear face side of the flat portion, it is possible to surely conduct spot welding even when the leg has a sufficiently large thickness, thereby allowing the terminals to have a low resistance.

According to the cell pack, a plurality of cylindrical cells constituting the cell pack are connected to each other by a connecting member which is screwed to the terminals by bolts or nuts. Therefore, the cells can be connected to each other via a connecting member of a sufficiently large thickness, so that the cell pack is assembled with a low resistance.

According to the cell pack, a flexible material is used in the connecting member made of an electrically conductive material. Even when vibration or shock is applied to the cell pack, therefore, the force acting between the cylindrical cells is absorbed by the flexible material of the connecting member so that the bolts and nuts are prevented from loosening.

According to the cell pack, a plurality of cylindrical cells constituting the cell pack are held by the holder so that the face portions of the terminals on each side of the cylindrical cells to be positioned in a substantially same plane. Consequently, the terminals can be connected to each other by the shortest distance of the connecting member, whereby the increase of resistance which may be caused by a longer connecting member can be prevented from occurring.

It is a still further object of the invention to provide a cell holder in which upper and lower end portions of sealed-type cells are held by a pair of supporting members provided with a vent hole, thereby allowing heat generated from the sealed-type cells to be dissipated to the exterior via the vent hole.

It is a still further object of the invention to provide a cell holder in which, in order to solve the above-discussed problems, the cell holder comprises a pair of upper and lower plate-like supporting members, a plurality of cell holes of a predetermined depth into which a positive or negative terminal of each of sealed-type cells which are sandwiched between the pair of supporting members is to be fitted are formed in an opposing face of each of the supporting members, a terminal hole elongating to a side opposite to the opposing face is opened in a part of a bottom face of each of the cell holes, and a vent hole elongating from the opposing face to the opposite side is opened at an adequate position between the plurality of cell holes.

It is a still further object of the invention to provide a cell holder in which the cell holder comprises a pair of upper and lower plate-like supporting members, a plurality of cell holes of a predetermined depth into which a positive or negative terminal of each of sealed-type cells which are sandwiched between the pair of supporting members is to be fitted are formed in an opposing face of each of the supporting members, a terminal hole elongating to a side opposite to the opposing face is opened in a part of a bottom face of each of the cell holes, and a vent groove elongating from the opposing face to the opposite side is formed at an adequate position of an inner peripheral face of each of the plurality of cell holes and terminal holes.

It is a still further object of the invention to provide a cell holder in which a groove elongating from the opposing face to the opposite side is formed at an appropriate position of a side face of each of the supporting members.

It is a still further object of the invention to provide a cell holder in which terminals which are different in height from each other are disposed at both ends of each of the sealed-type cells, and the cell holes are formed at depths which are different from each other by a difference in height of the terminals in accordance with a polarity.

It is a still further object of the invention to provide a cell holder in which a projection is formed in at least one of a peripheral end portion of a face opposite to the opposing face of each of the supporting members, and a peripheral end portion of the vent hole or vent groove.

According to the thus configured cell holder, a plurality of sealed-type cells are held between the pair of upper and lower supporting members provided with the vent hole by fitting the hermetically sealed portions at the both ends of the sealed-type cells into the cell holes, and hence heat generated from the sealed-type cells can be dissipated to the exterior via the vent hole. Since the outward-directed peripheral side faces of the sealed-type cells are exposed to the exterior between the pair of upper and lower supporting members, heat can be dissipated also from the faces. The terminals at the both end portions of the sealed-type cells are exposed from the upper and lower faces of the supporting members via the terminal holes, so that the sealed-type cells are connected to each other or to an external device.

Heat generated from the sealed-type cells can be dissipated to the exterior via the vent groove which is formed at an adequate position of the inner peripheral faces of the plurality of cell holes and terminal holes and elongates from the opposing face to the opposite side.

When a plurality of cell holders in each of which a plurality of sealed-type cells are held by the pair of upper and lower supporting members are arranged side-by-side, the grooves respectively formed on the side faces of adjacent supporting members play the same role as the vent hole. Accordingly, heat generated from the sealed-type cells can be dissipated to the exterior via the grooves.

When sealed-type cells are arranged in such a manner that the polarities of adjacent cells are positionally inverted, the tip ends of the both terminals of the sealed-type cells can be made flush with each other because the cylindrical portions of the sealed-type cells are fitted into the cell holes at depths which are different from each other. Consequently, a connecting member through which the terminals are connected to each other so that the sealed-type cells are connected in series can have a simple shape such as a flat-plate like shape, and hence is not required to be changed in shape in accordance with a polarity. When the connecting member is fixedly connected to the terminals by screwing or the like, the pair of upper and lower supporting members can be surely fixed to a plurality of sealed-type cells.

Furthermore, it is possible to block a connecting plate from being rotated when it is detached, thereby preventing adjacent cells from being short-circuited, and a short circuit from occurring when cell packs are stacked.

In the cell pack using the cell holder of the invention, when the cylindrical cells are separated from each other by a sufficiently large distance, it is not required to cover the peripheral side faces of the cylindrical cells by a film of a resin, or the like. When the cylindrical cells are not separated from each other by a sufficiently large distance, the electrical insulation between the cylindrical cells can be ensured by covering the peripheral side faces of the cylindrical cells by a film of a resin, or the like.

On the other hand, in the cell pack using the cell holder of the invention, the cooling effect can be further enhanced by forcedly producing an air flow by a cooling fan, a nozzle ejecting a cooling air, or the like.

BRIEF DESCRIPTION OF THE DRAWINGS

FIG. 8(A) is a perspective view of the whole of the cylindrical cell in the state where a connecting member is screwed to the terminal, and FIG. 8(B) is a perspective view showing a modification of the connecting member;

DETAILED DESCRIPTION OF THE PREFERRED EMBODIMENTS

Hereinafter, embodiments of the invention will be described with reference to the accompanying drawings.

Figure 10:
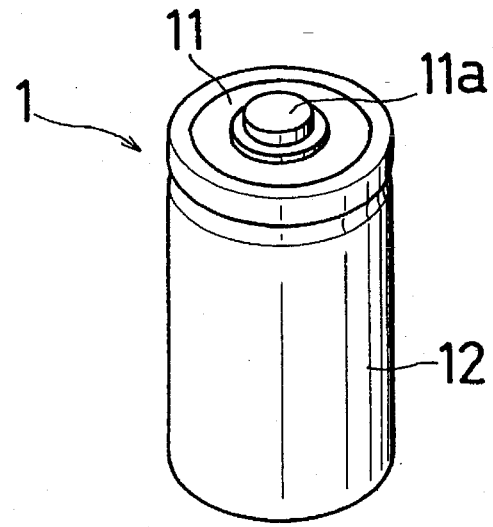
FIG. 10 is a perspective view showing the configuration of a prior art cylindrical cell.
Figure 11:
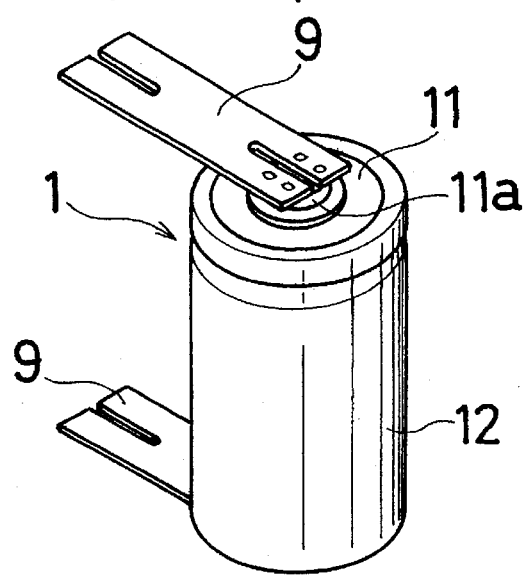
FIG. 11 is a perspective view showing the whole of a state where a nickel plate is attached to the prior art cylindrical cell.
Figure 12:
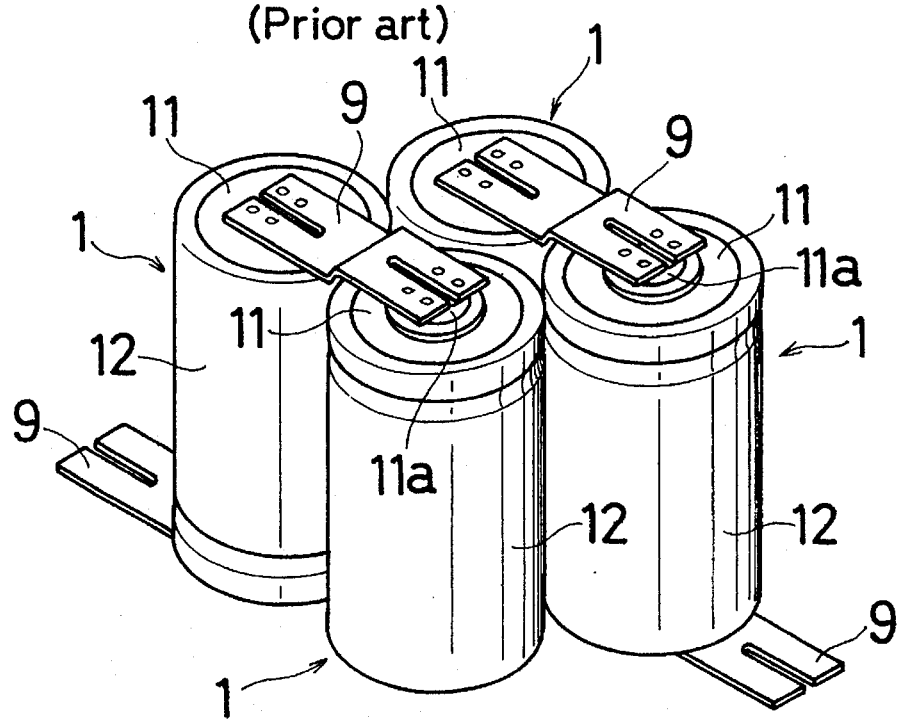
FIG. 12 is a perspective view showing the whole of a prior art cell pack configured by four prior art cylindrical cells.

In the description of the embodiments, components having the same functions as those of the prior art example shown in FIG. 10 are designated by the same reference numerals and their description is omitted.

Figure 3:
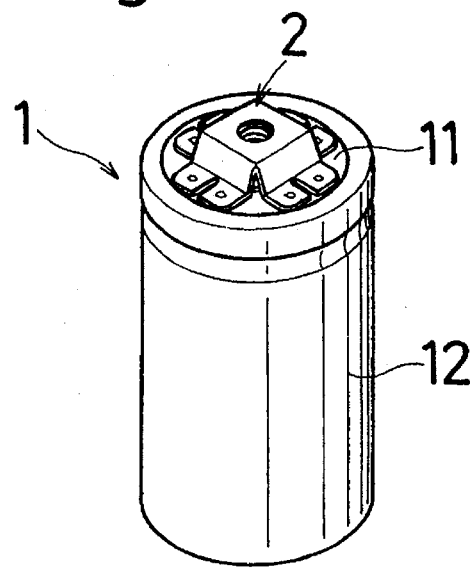
FIG. 3 shows an embodiment of the invention and is a perspective view of the whole of the cylindrical cell as viewed from the positive terminal side.
Figure 4:
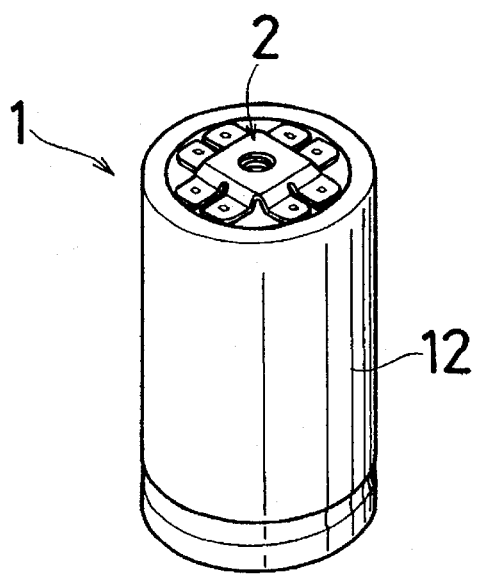
FIG. 4 shows an embodiment of the invention and is a perspective view of the whole of the cylindrical cell as viewed from the negative terminal side.

An embodiment of the invention is applied to the cylindrical cell 1 shown in FIG. 10. However, the kind of the cell is not restricted to a nickel-cadmium cell and a nickel-metal hydride cell. In the cylindrical cell 1, as shown in FIG. 3, a high-profile terminal 2 is attached to a cover 11 on the positive terminal side, and, as shown in FIG. 4, a low-profile terminal 2 is attached to the bottom face of a case 12 on the negative terminal side.

Figure 1:
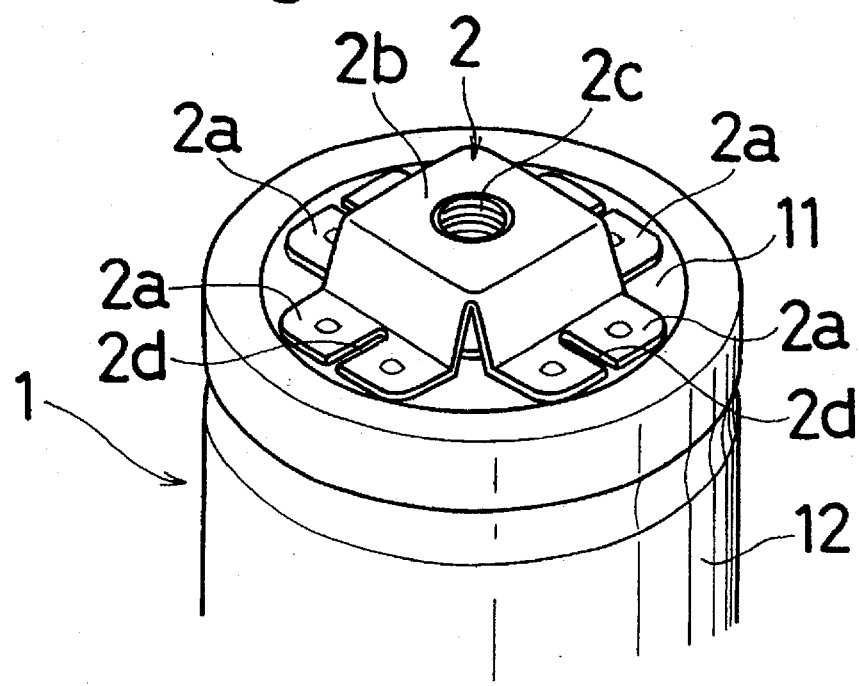
FIG. 1 shows an embodiment of the invention and is a partial enlarged perspective view showing a terminal attached to the positive terminal of a cylindrical cell.

As shown in FIG. 1, the terminal 2 on the positive side is configured so that the four ends of a metal plate which has a substantially cross shape and is electrically conductive are bent into legs 2a and the center face portion 2b are projected. In the face portion 2b of the terminal 2, a through hole is formed at the center, an end of a cylindrical female threaded hole portion 2c in which a female threaded hole is formed on the inner face is welded from the rear face side to the through hole.

The terminal having such a configuration can be easily produced by previously forming a hole of a suitable size at the center of an area of a metal plate having a substantially cross shape where the face portion 2b is to be formed, and then attaching a weld nut so as to be aligned with the area. In the case where a male threaded portion is to be erected, similarly, the terminal can be easily produced with using a weld nut.

Figure 2:
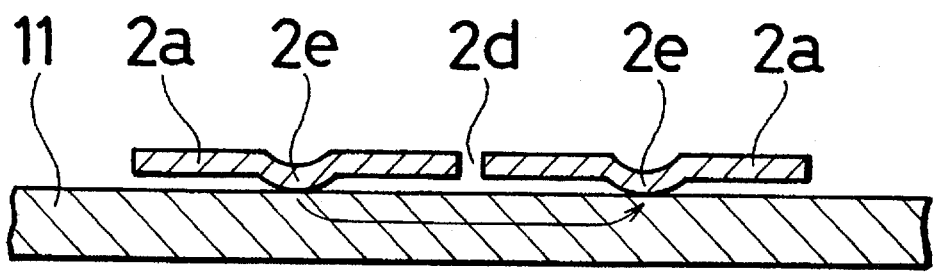
FIG. 2 shows an embodiment of the invention and is a longitudinal section view of the vicinity of a leg of the terminal shown in FIG. 1.

The legs 2a which are formed by bending the four sides of the face portion 2b are further bent at the respective tip ends in the opposite direction so that the tip end portions are formed into a flat shape. A slit 2d is formed so as to elongate from the end of the flat shape to the basal area of the flat portion. As illustrated, the slit 2d may be formed so as to reach the end area. In some cases, the slit may be imperfectly formed in such a manner that the basal area or the tip end area of the flat portion is partly connected. As shown in FIG. 2, projections 2e are formed so as to respectively project from the rear faces of the flat portion of each leg 2a which are separated by the slit 2d. The terminal 2 is spot-welded to the surface of the cover 11 of cylindrical cell 1 under the state where the projections 2e of each of the legs 2a at the four sides are made contact with the surface, whereby the terminal is fixedly connected to the cover. In the spot welding, therefore, the welding current which flows from one of the projections 2e to the other projection 2e is blocked by the slit 2d so as to flow through the cover 11 as indicated by the arrow in FIG. 2, with the result that the spot welding between the projections 2e and the cover 11 is surely conducted. The tip ends of the projections 2e are made point-contact with the surface of the cover 11 so that the welding current is sufficiently concentrated to the contact portions. Even when the legs 2a have s sufficiently large thickness, therefore, it is possible to surely conduct the spot welding so that the resistance of the terminal 2 is reduced.

Also, the terminal 2 on the negative side is configured in the same manner as the terminal 2 shown in FIGS. 1 and 2. That is, the terminal 2 is fixedly connected to the bottom face of the case 12 by spot-welding the legs 2a of the four sides to the bottom face. Since the covers 11 has the projection 11a, however, the terminal 2 on the positive side is large in step difference of the legs 2a and hence has the profile higher than the terminal 2 on the negative side.

In the embodiment, the terminal is attached by spot welding. Alternatively, the attachment may be conducted as required by another attaching method such as laser welding.

Figure 5:
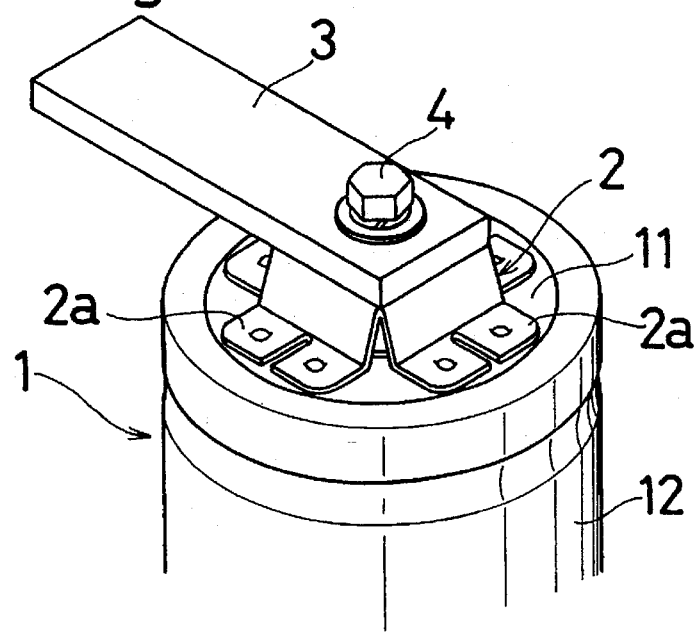
FIG. 5 shows an embodiment of the invention and is a partial enlarged perspective view showing the case where a connecting plate is screwed to the terminal of the cylindrical cell.
Figure 6:
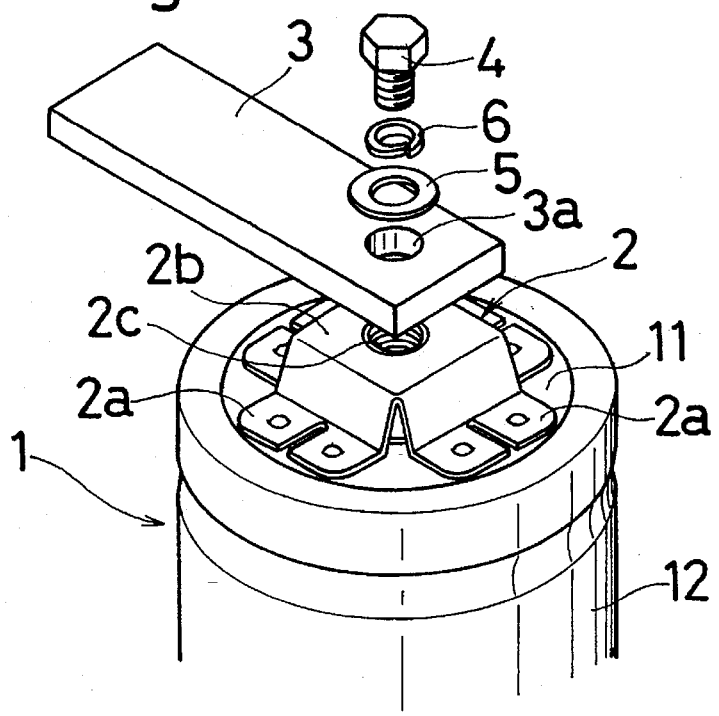
FIG. 6 shows an embodiment of the invention and is an exploded perspective view of the structure of FIG. 5.
Figure 7:
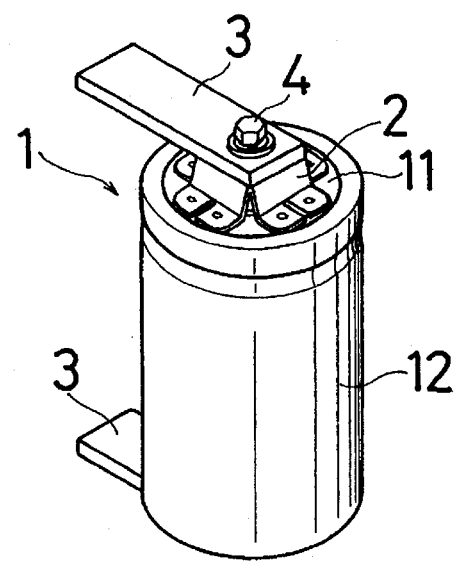
FIG. 7 shows an embodiment of the invention and is a perspective view of the cylindrical cell in the state where a connecting plate is screwed to the terminal of the cylindrical cell.

When the thus configured cylindrical cell 1 is to be singly connected to a power source circuit of an apparatus, a connecting member 3 is screwed to the terminal 2 by a bolt 4 as shown in FIG. 5. The connecting member 3 is configured by a metal plate which has a sufficiently large thickness and is electrically conductive. As shown in FIG. 6, a bolt hole 3a is formed at one end portion of the plate-like shape. The screwing is conducted by placing the one end portion of the connecting member 3 on the face portion 2b of the terminal 2, inserting the bolt 4 into the bolt hole 3a of the connecting member 3 via a washer 5 and a spring washer 6 for locking, so as to pass therethrough, and fastening the bolt 4 to the female threaded hole portion 2c of the terminal 2. FIGS. 5 and 6 show the case where the connecting member 3 is screwed to the terminal 2 on the positive side. When another connecting member 3 is screwed to the terminal 2 on the negative side in the same manner, the positive and negative terminals of the cylindrical cell 1 can be drawn out via the connecting members 3, respectively.

As a result, according to the embodiment, the cylindrical cell 1 is allowed to be connected to the power source circuit of the apparatus by screwing the connecting members 3 of a sufficiently large thickness to the terminals 2 on the positive and negative sides of the cell. If the material and the width and length of the plate-like shape are the same, the sectional area of each connecting member 3 is larger so that the resistance is lower, as the thickness of the member is larger. Even when the cylindrical cell 1 must supply a large current, therefore, the voltage drop and heat generation in the connecting members 3 can be reduced.

Figure 8:
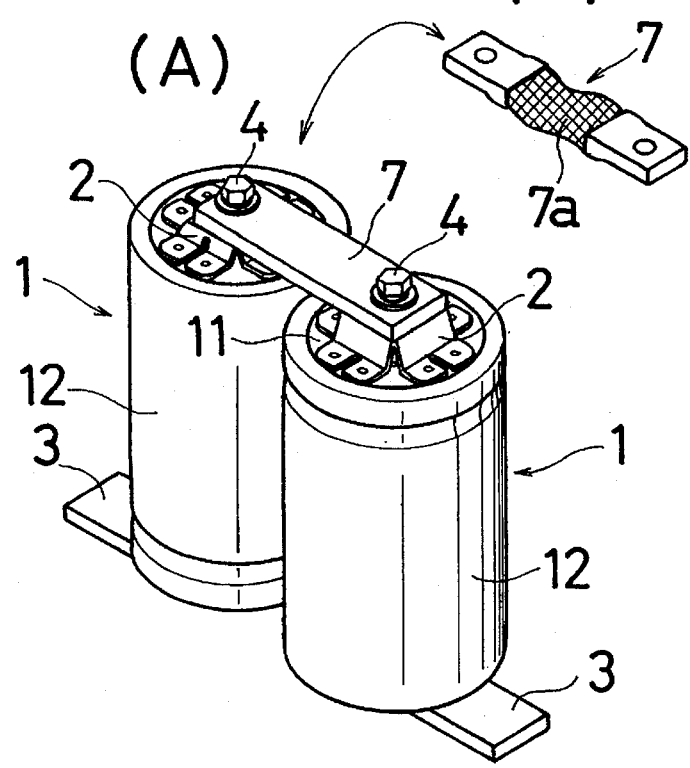
FIG. 8 shows an embodiment of the invention.

When the thus configured cylindrical cell 1 is used as an elementary cell of a cell pack, as shown in (A) of FIG. 8, two cylindrical cells 1 are arranged side-by-side while the positive terminal side of one of the cylindrical cells 1 and the negative side of the other cylindrical cell 1 are directed to the same direction. A connecting member 7 is connected between the terminal 2 of the positive side and that of the negative side in one side of the cylindrical cells 1, and screwed to the terminals by bolts 4. Specifically, the connecting member 7 used in the cell pack is configured by a metal plate which has a sufficiently large thickness and is electrically conductive in the same manner as the member 3 shown in FIG. 6, but a bolt hole is formed in each of the both ends of the plate-like shape. The screwing is conducted by respectively fastening the bolts 4 to female threaded hole portions 2c of the terminals 2 via the bolt holes, with the result that the cylindrical cells 1 are connected in series. The cell pack in which the two cylindrical cells 1 are connected in series is allowed to be connected to the power source circuit of the apparatus, by screwing the connecting members shown in FIGS. 5 and 6 to the terminal 2 of the positive side and that of the negative side in the other side of the cylindrical cells 1. Also in this screwing of the connecting member 7 by using the bolts 4, in the same manner as the case of the connecting member 3, washers and spring washers for locking are used.

As a result, according to the embodiment, in the case where the cylindrical cells 1 are used in the form of a cell pack, the cylindrical cells 1 are connected to each other by the connecting member 7 of a sufficiently large thickness, and hence the voltage drop and heat generation in the connecting member 7 can be reduced.

As shown in (B) of FIG. 8, alternatively, the center portion 7a of the connecting member 7 may be configured by a material which is flexible (for example, a net consisting of metal wires of an electrically conductive material). In the alternative, even when vibration or shock is applied to the cell pack, the force acting between the cylindrical cells 1 is absorbed by the flexibility of the connecting member 7, and hence the bolts 4 are prevented from loosening. In the connecting member 7, not only the center portion 7a but also the whole of the member may be configured by a flexible material. Also in the case where the whole or a part of the connecting members 3 is configured by a flexible material, the same effects can be attained.

Figure 9:
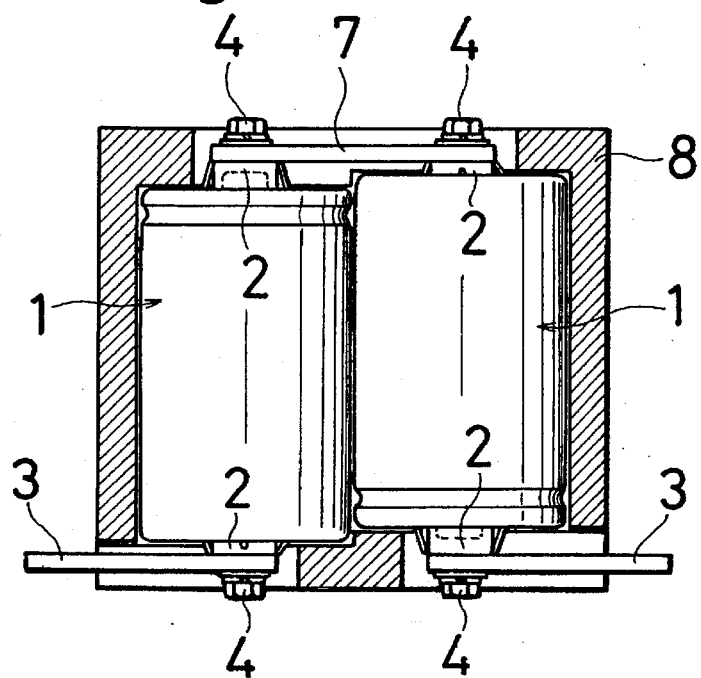
FIG. 9 shows an embodiment of the invention and is a side view showing the case where cylindrical cells constituting a cell pack are held by a holder.

As shown in FIG. 9, the cylindrical cells 1 used as the cell pack may be held by a holder 8 which causes the cells 1 to be positioned in such a manner that the face portions 2b of the terminals 2 in each side are in the substantially same plane. In this case, the connecting member 7 is not required to be bent or can be made flat so that the terminals 2 are connected to each other by the shortest distance. If the other conditions are the same, the resistance of the connecting member 7 is lower as the member is shorter. Consequently, the use of the holder 8 allows the connecting member 7 to connect the terminals 2 to each other by the shortest distance, thereby preventing the resistance of the connecting member 7 from being increased.

FIGS. 8 and 9 show the cases where a cell pack is configured by two cylindrical cells 1. Also in the case where three or more cylindrical cells 1 are used, a cell pack is similarly configured by connecting the cylindrical cells 1 to each other via connecting members 7. In these cell packs, in place of connecting all the cylindrical cells 1 in series, all the cylindrical cells 1 may be connected in parallel or in a combination of series and parallel connections.

In the embodiments described above, the female threaded hole portion 2c is formed in the terminal 2. Alternatively, a male threaded portion may be erected at the center of the face portion 2b of each terminal 2. In the alternative, the connecting members 3 and 7 are screwed by in respectively inserting the male threaded portions into the bolt holes 3a and 7a and fastening nuts.

As apparent from the above description, in the cylindrical cell of the invention, the cylindrical cells are assembled by means of low-resistance connecting members screwed to the terminals by using bolts, nuts, or the like. Even when a large current is to be supplied, the voltage drop and heat generation in the connecting members can be suppressed so that the most of the cell performance can be exerted. The formation of the slit and the projection in the leg of each terminal allows the terminal to be surely subjected to the spot welding. Also in the case where the cylindrical cell is used in a cell pack, the cylindrical cells are connected to each other by connecting members of a sufficiently large thickness so that the cell pack can be assembled with a low resistance, and hence the most of the performance of each cell can be exerted. The use of a flexible material in the connecting member enables forces acting between the cells to be buffered, thereby preventing the bolts or nuts used in the connection of the cells from loosening. When the cylindrical cells of the cell pack are held by the holder, the cells can be connected to each other by connecting members by the shortest distance, and hence the resistances of the connecting members can be further reduced.

Figure 13:
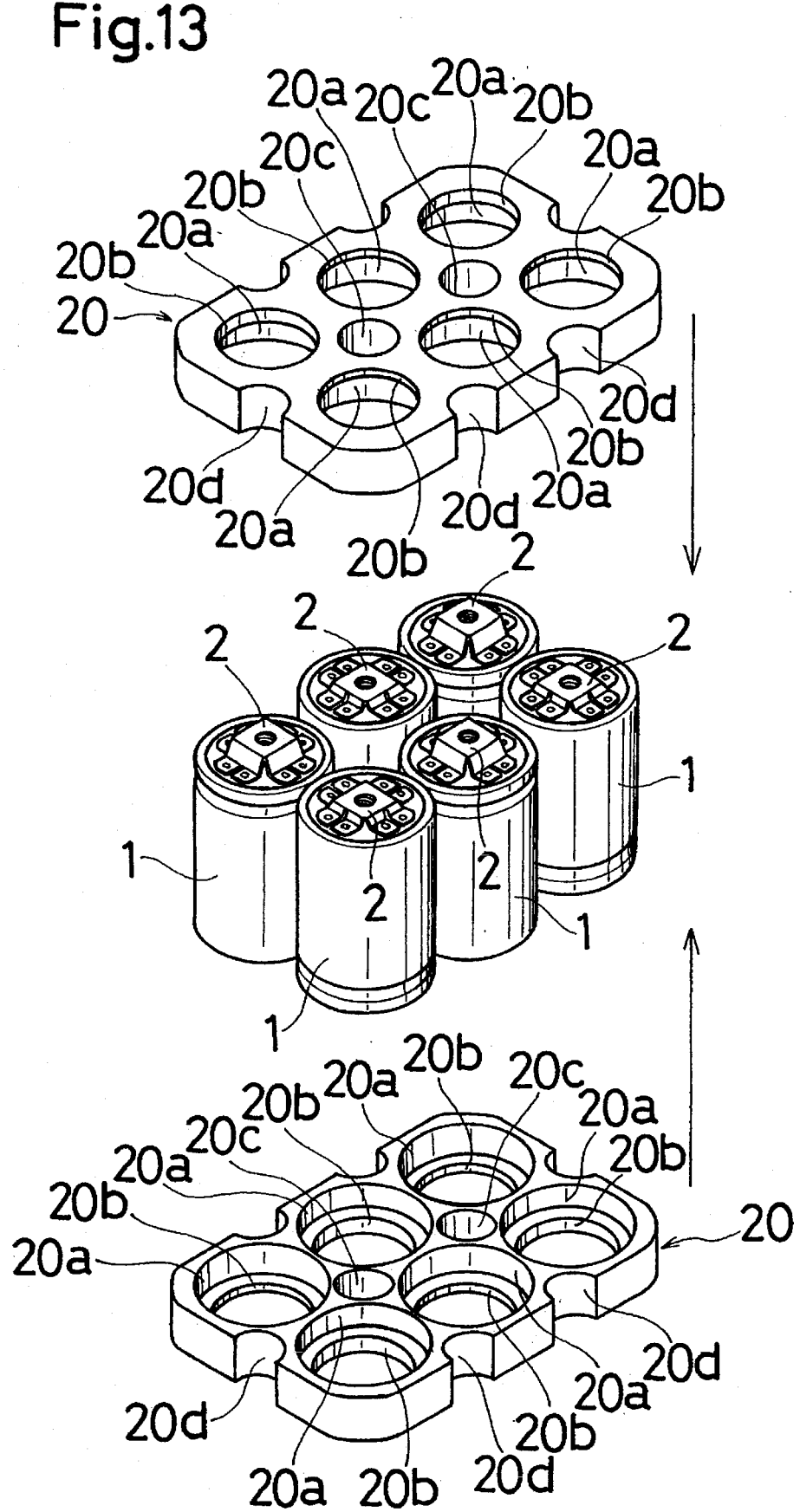
FIG. 13 shows an embodiment of the invention and is a perspective view showing the assembly of a cell holder.

Next, an embodiment of the cell holder of the invention in which six cylindrical cells each consisting of a nickel-cadmium cell or a nickel-metal hydride cell are held will be described. In the invention, however, the kind and shape of the cell are not restricted to the above, conventional manganese cells may be used, and sealed-type cells of other types such as those of rectangular cells may be used. As shown in FIG. 13, the six cylindrical cells 1 are arranged in such a manner that positive and negative terminals of adjacent cells are directed in a vertically inverted manner, and into two rows each consisting of three cells. In each of the cylindrical cells 1, terminals 2 for the positive and negative sides are attached to the both ends of a cylindrical shape, respectively. The terminals 2 are electrically conductive connection members in each of which the connecting face where a female threaded hole is opened at the center is supported by legs of the four sides so as to be projected and which are fixed by spot-welding to end faces of the cylindrical shape of the positive and negative sides of the cylindrical cell 1. The terminal 2 on the positive side is attached so that a projection (not shown) for housing a safety valve for gas releasing which is disposed on the end face of the cylindrical shape on the positive side of the cylindrical cell 1, and hence is taller than the terminal 2 on the negative side.

Figure 14:
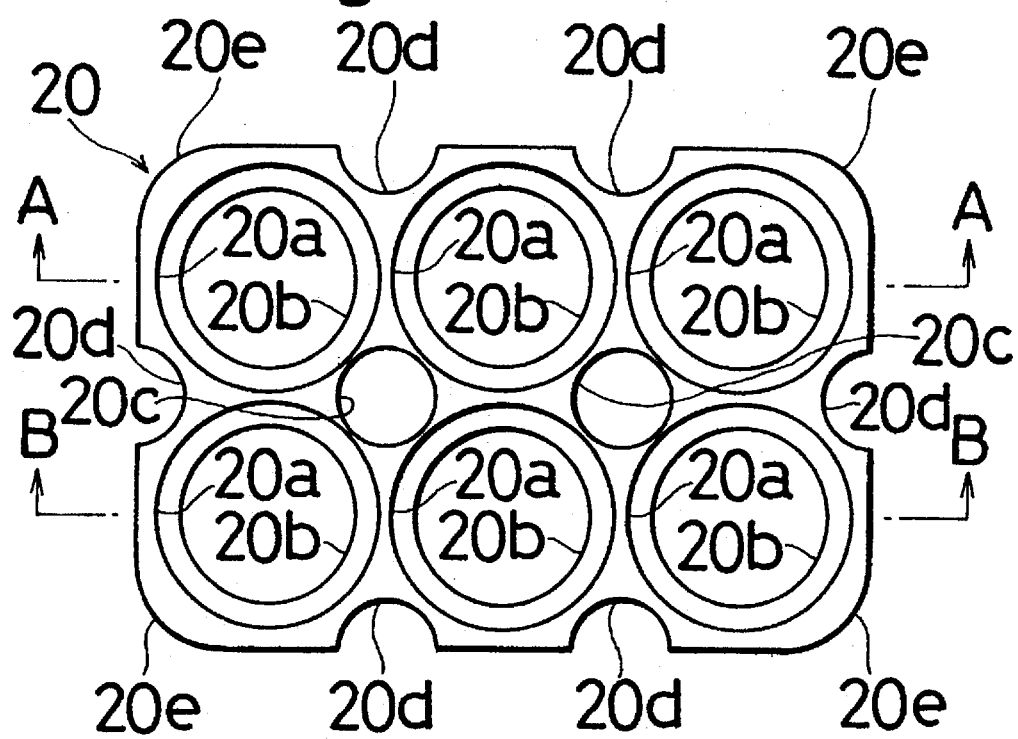
FIG. 14 shows an embodiment of the invention and is a plan view of a supporting member.
Figure 15:
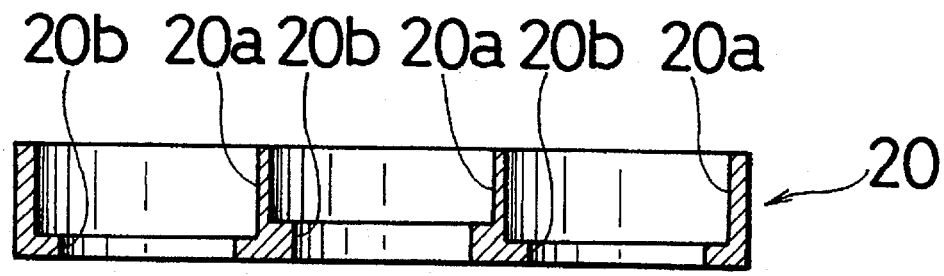
FIG. 15 shows an embodiment of the invention and is a section view taken along line A—A of FIG. 14.
Figure 16:
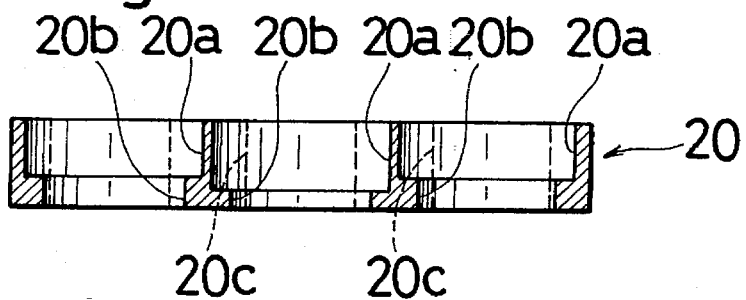
FIG. 16 shows an embodiment of the invention and is a section view taken along line B—B of FIG. 14.

The six cylindrical cells 6 are sandwiched between a pair of upper and lower supporting members 20 which are made of an insulating synthetic resin plate having a substantially square shape and have the same shape. As far as the problem of electric insulation is solved, any material may be used. The supporting members 20 are used while being disposed with opposing each other. In each of the supporting members 20, as shown in FIGS. 14 to 16, cell holes 20a having a diameter which is equal to or slightly greater than that of the cylindrical portion of the cylindrical cell 1 are formed in the surface which functions as the opposing face, into two rows each consisting of three holes. The cell holes 20a have two kinds of depths which are different from each other by the difference in height of the terminals 2 of the cylindrical cell 1, and are arranged in such a manner that adjacent ones have different depths. The cylindrical portion on the positive terminal side of the cylindrical cell 1 is fitted into one of the shallow cell holes 20a, and that on the negative terminal side is fitted into one of the deep cell holes 20a. In the bottom face of each cell hole 20a, a terminal hole 20b which is smaller in diameter than the cell hole 20a is opened so as to reach the rear face. Each terminal hole 20b is disposed so that, when the cylindrical portion of the cylindrical cell 1 is fitted into the cell hole 20a, the projection of the terminal 2 enters the terminal hole, thereby allowing the shoulder of the cylindrical portion to make contact with the bottom face of the cell hole 20a. Since the cell holes 20a into which the cylindrical portions on the positive and negative terminal sides are fitted are different in depth from each other, the connecting faces at the tip ends of the terminals 2 of both the positive and negative sides are substantially flush with the rear faces of the respective supporting members 20.

In each of the supporting members 20, a vent hole 20c elongating from the surface to the rear face is opened in each of two areas which are respectively surrounded by four cell holes 20a. On the side faces of the supporting members 20 and between adjacent cell holes 20a, a groove 20d which elongates from the surface to the rear face is formed. The four edges of each of the square supporting members 20 are cut by an arcuate convex shape so as to form rounded portions 20e.

Figure 17:
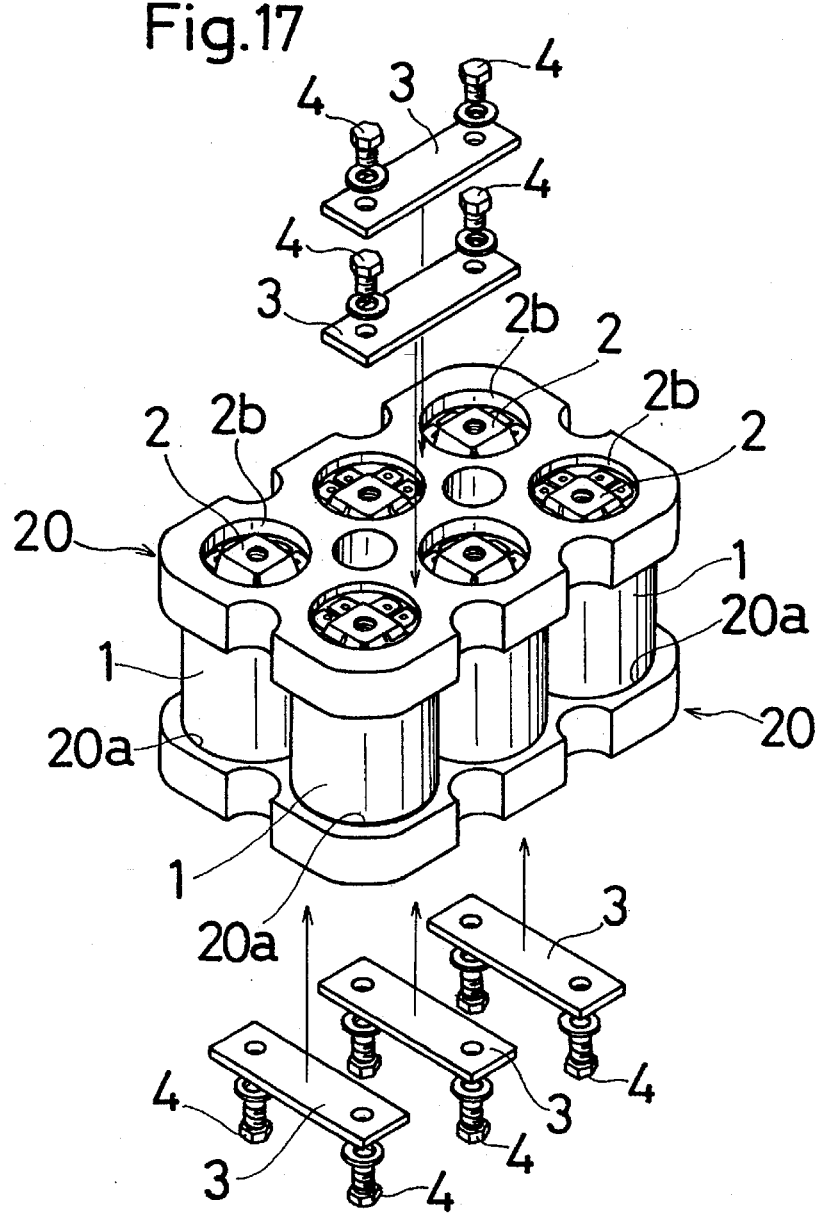
FIG. 17 shows an embodiment of the invention and is a perspective view showing the assembly state where a connecting plate is screwed to the cell holder.
Figure 18:
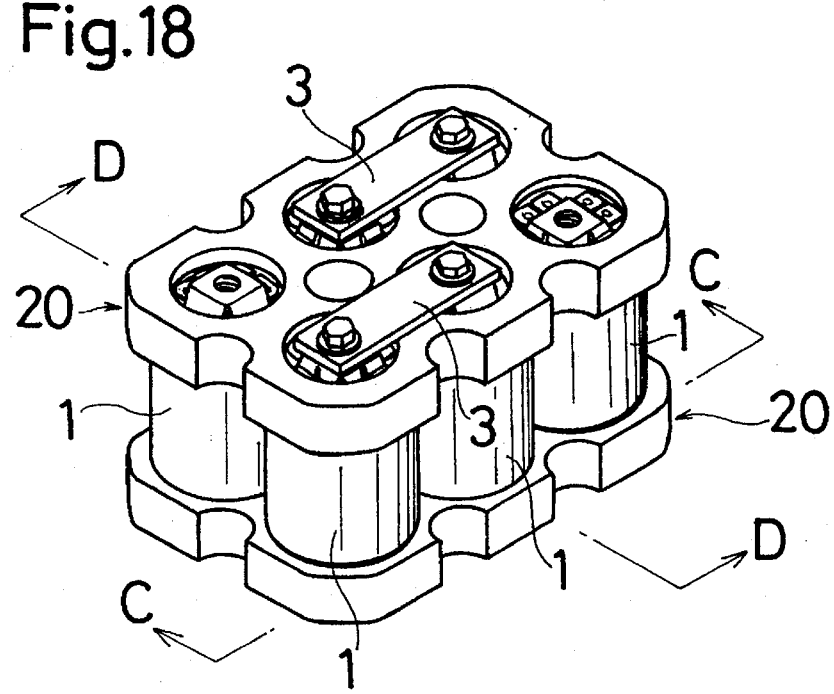
FIG. 18 shows an embodiment of the invention and is a perspective view of a cell holder.
Figure 19:
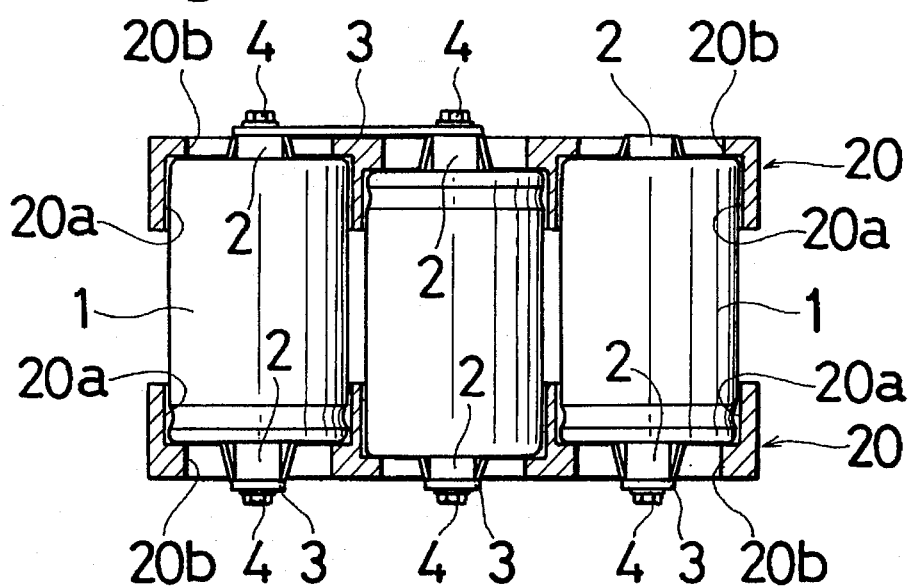
FIG. 19 shows an embodiment of the invention and is a section view taken along line C—C of FIG. 18.

The pair of upper and lower supporting members 20 which are configured as described above are disposed with being directed so that, as shown in FIG. 17, their surfaces oppose each other and the opposing cell holes 20a are different in depth from each other. As indicated by the arrows in FIG. 13, the cylindrical portions on the positive and negative terminal sides of six cylindrical cells 1 are fitted into the cell holes 20a of the upper and lower supporting members 20, respectively. As a result, as shown in FIG. 17, the six cylindrical cells 1 are sandwiched between the upper and lower supporting members 20 and the terminals 2 of the cylindrical cells 1 are exposed from the respective terminal holes 20b. On the side of the rear face of the upper supporting member 20 (on the face which is directed upward), connecting members 3 which are made of an electrically conductive material and have a flat plate-like shape are placed between terminals 2 which are adjacent to each other in the row direction, and then screwed to the terminals by bolts 4, and, on the side of the rear face of the lower supporting member 20 (on the face which is directed downward), similar connecting members 3 are placed between terminals 2 which are adjacent to each other and in different rows, and then screwed to the terminals by bolts 4. As a result, as shown in FIG. 18, all the six cylindrical cells 1 between the terminals 2 exposed from the two terminal holes 20b of the upper supporting member 20 in which the connecting members 3 are not attached are connected in series. The screwing of the connecting members 3 by the bolts 4 is conducted by causing the male threaded portions of the bolts 4 to respectively pass through the threaded holes formed at the both ends of the connecting members 3 and fastening the bolts to the connecting faces of the terminals 2. In this case, as shown in FIG. 19, the connecting faces of both the terminals 2 are substantially flush with the rear face of the supporting member 20, and hence the flat-plate like connecting member 3 can be placed as it is at a position which substantially contacts with the rear face of the supporting member 20 or in parallel with the face, and screwed by the bolts 4. The screwing of the connecting members 3 causes the upper and lower supporting members 20 to be integrally fixed to the six cylindrical cells 1.

Figure 20:
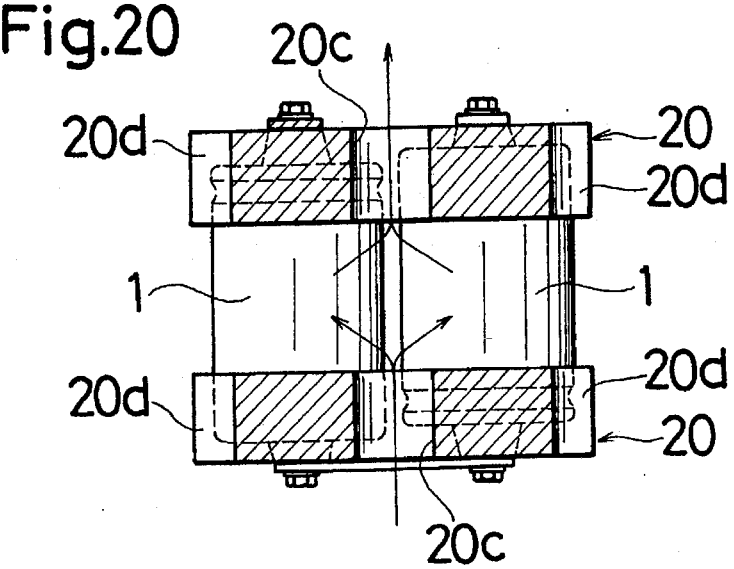
FIG. 20 shows an embodiment of the invention and is a section view taken along line D—D of FIG. 18.

In the cell holder in which the six cylindrical cells 1 are held by the pair of supporting members 20 as described above, as indicated by the arrows in FIG. 20, ventilation is enabled between the exterior and the vicinity of the inward-directed peripheral side faces of the cylindrical cells 1, via the vent holes 20c of the supporting members 20. Consequently, heat generated from the cylindrical cells 1 can be rapidly dissipated to the exterior. The outward-directed peripheral side faces of the cylindrical cells 1 which are arranged in two rows are exposed as they are between the upper and lower supporting members 20, so that heat can be dissipated also from the faces. Accordingly, the heat dissipation of the cylindrical cells 1 is accelerated by the vent holes 20c and the like, whereby the temperature rise of the cylindrical cells 1 can be suppressed so as not to exceed the specified range. The ventilation due to the vent holes 20c and the like is conducted by natural convention. Particularly when the amount of generated heat is large, the ventilation may be forcedly conducted by using a fan or the like.

Figure 21:
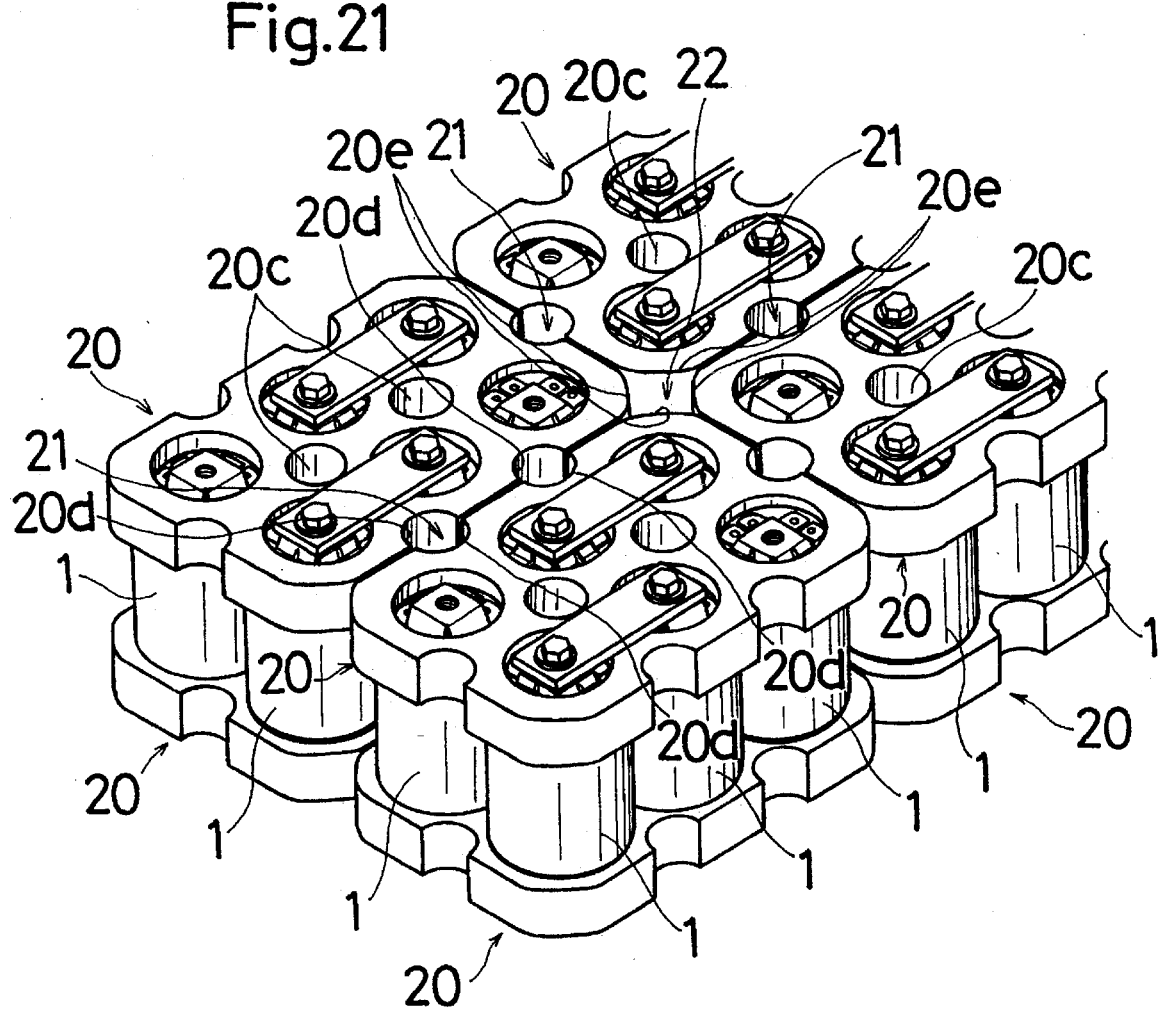
FIG. 21 shows an embodiment of the invention and is a partial perspective view showing the case where a plurality of cell holders are arranged.

In the case where a plurality of cell holders in each of which six cylindrical cells 1 are held by the pair of supporting members 20 are arranged side-by-side as shown in FIG. 21, the grooves 20d respectively formed on the side faces of adjacent supporting members are aligned with each other so as to form through holes 21 which are similar to the vent holes 20c. Even when a number of cylindrical cells are densely arranged as described above, therefore, heat can be dissipated via the through holes 21 formed by the grooves 20d, and hence there is no fear that the heat radiation effect is impaired. In an area where four cell holders are made contact with each other, the rounded portions 20e at the edges of the supporting members 20 constitute a through hole 22 so that heat is dissipated also via the through hole 22.

Figure 22:
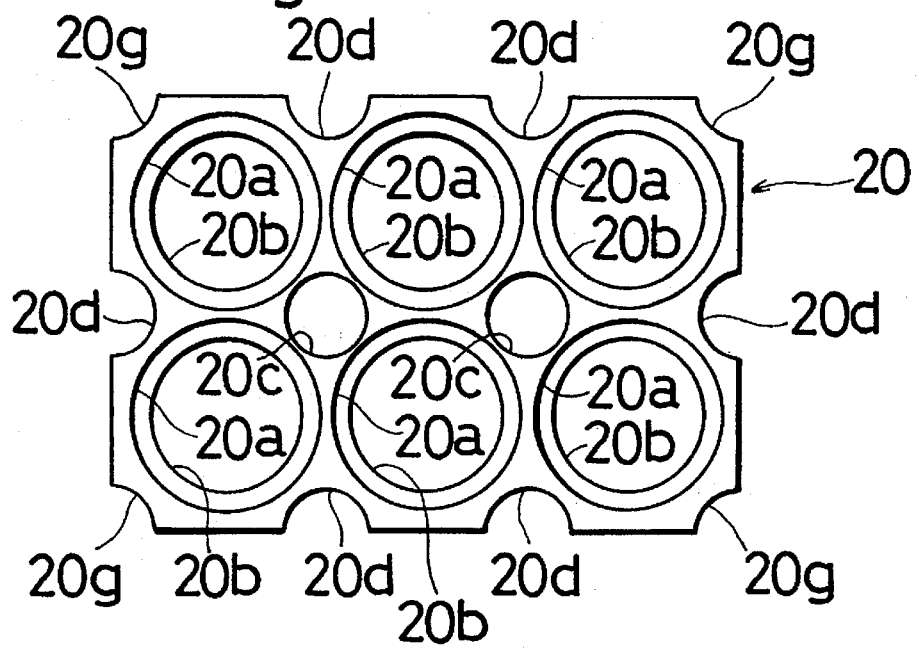
FIG. 22 shows an embodiment of the invention and is a plan view showing another shape of the supporting member.
Figure 23:
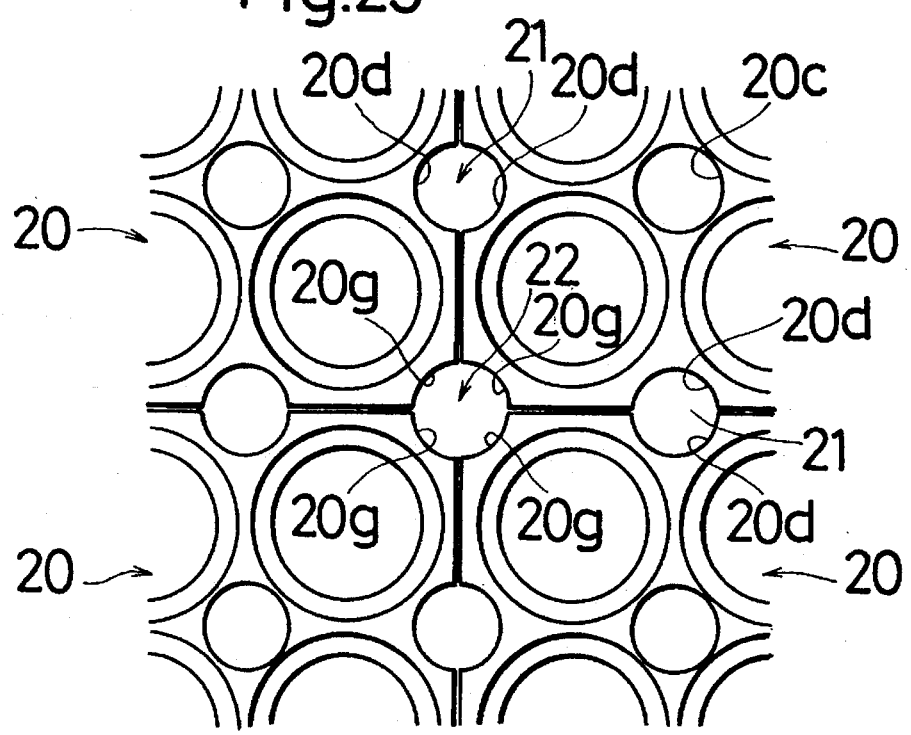
FIG. 23 shows an embodiment of the invention and is a partial plan view showing an edge in the case where a plurality of the supporting members shown in FIG. 22 are arranged.

In place of the rounded portions 20e at the four edges of the square supporting member 20, as shown in FIG. 22, edge grooves 20g which are formed by cutting the supporting member into a rounded concave shape may be formed. In this case, as shown in FIG. 23, a through hole 21 at each edge area where the four cell holders are made contact with each other is configured as a cylindrical hole in the same manner as the vent holes 20c, with the result that the through hole 21 can be made coincident in shape with the original vent holes 20c and the through holes 21 formed by the grooves 20d.

Figure 24:
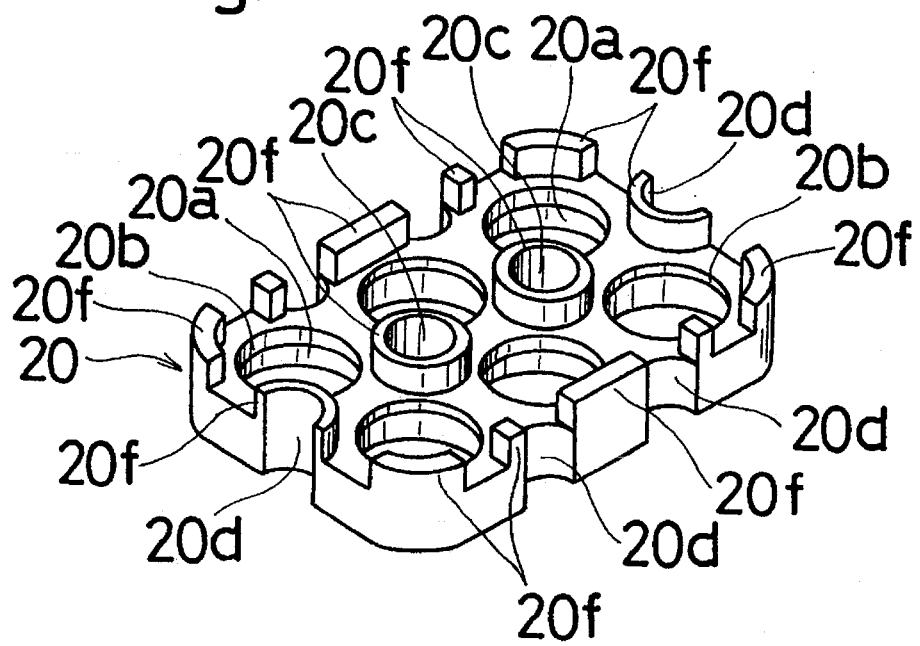
FIG. 24 shows an embodiment of the invention and is a perspective view showing the case where projections are formed in the periphery of the face opposite to the opposing face of the supporting member, and that of a vent hole or a vent groove.

As shown in FIG. 24, projections 20f which are projected by the same height may be formed in the peripheral edge portions of the face of each supporting member 20 which is opposite to the opposing face, the vent holes 20c, the vent grooves 20d, and the rounded portions 20e. The provision of the projections 20f can block the connecting members 3 from being rotated when they are detached, thereby preventing adjacent cells from being short-circuited, and a short circuit from occurring when cell packs are stacked. The projections 20f are not required to be formed at all the peripheral edges, but adequately disposed at two or three positions of the supporting member.

Figure 25:
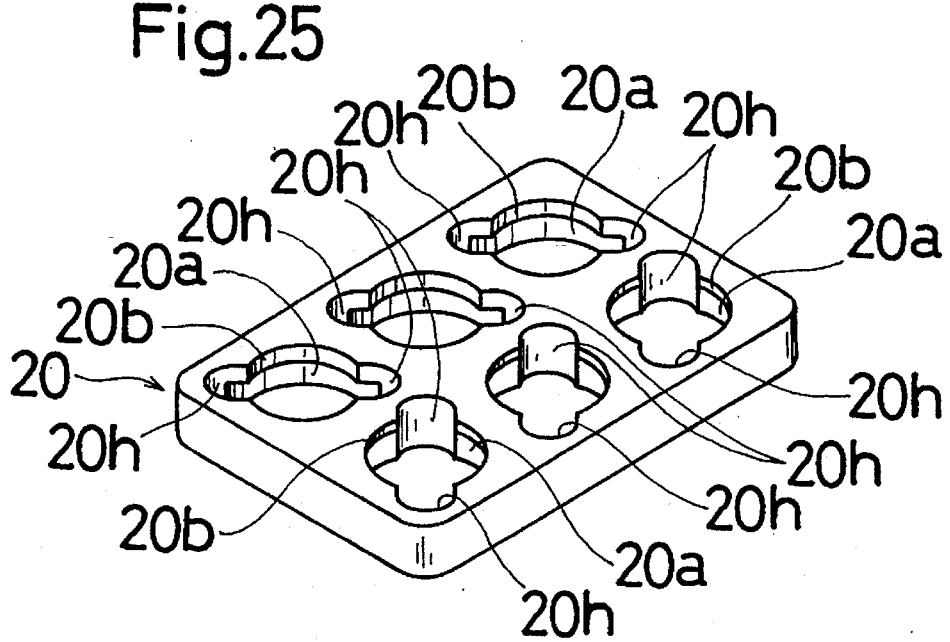
FIG. 25 shows an embodiment of the invention and is a perspective view showing the case where a vent groove is formed in the inner peripheral faces of cell holes and terminal holes.

In the embodiment described above, the vent holes 20c are formed at appropriate positions between the plurality of cell holes 20a. Alternatively, as shown in FIG. 25, in place of the vent holes 20c, vent grooves 20h which elongate from the opposing face to the opposite side may be formed at appropriate positions of the inner peripheral faces of the plurality of cell holes 20a and terminal holes 20b.

In the embodiment, the cell holder holds six cylindrical cells 1. The number of cylindrical cells 1 which can be held by the holder can be set arbitrarily. The cell holes and the like in each supporting member 20 are formed in accordance with the number of the cylindrical cells 1 and the manner of arrangement.

According to the cell holder of the invention, heat generated from cylindrical cells can be dissipated to the exterior via the vent holes of the supporting members and the exposed side portions between the upper and lower supporting members. Consequently, the temperature rise of the cylindrical cells can be suppressed by means of natural convection or forced ventilation. Also when a plurality of cell holders in each of which cylindrical cells are held by a pair of supporting members are arranged, heat can be dissipated to the exterior via the grooves between adjacent supporting members. Even in the case where a number of cylindrical cells are densely packed, therefore, the temperature rise can be surely suppressed. Furthermore, even in the case where the terminals of cylindrical cells are different in height depending on the polarity, the terminals can be easily connected to each other by a connecting member of a shape such as a flat-plate like shape.

What is claimed is:

1. A cylindrical cell comprising positive and negative terminals which are disposed at both ends, wherein terminals made of an electrically conductive material and having a face portion where a female threaded hole is opened or a male threaded portion is erected are respectively fixedly connected to a cover and a bottom face of a case via legs which support said face portion.

2. A cylindrical cell according to claim 1, wherein tip ends of said legs of said terminals are formed into a flat-plate like shape, each of said flat portions of said legs is provided with at least one of a slit and a projection which is projected from a rear face of said flat portion, and said legs are fixedly connected by spot-welding said flat portions of said legs to said cover and said bottom face of said case.

3. A cell pack wherein a plurality of cylindrical cells according to claim 1 are arranged side-by-side, a connecting member in which bolt holes are opened at both end portions and which is made of an electrically conductive material is used, and bolts are respectively fitted into said both bolt holes of said connecting member and said bolts are fastened to female threaded holes which are opened in face portions of terminals of different cylindrical cells, or male threaded portions erected on face portions of terminals of different cylindrical cells are respectively fitted into said both bolt holes of said connecting member and nuts are respectively fastened to said male threaded portions, or a bolt is fitted into one of said bolt holes of said connecting member and said bolt is fastened to a female threaded hole which is opened in a face portion of a terminal of one of said cylindrical cells and a male threaded portion erected on a face portion of a terminal of another one of cylindrical cells is fitted into the other both bolt hole and a nut is fastened to said male threaded portion, thereby connecting said cylindrical cells with each other.

4. A cell pack according to claim 3, wherein a part or whole of said connecting member which is made of an electrically conductive material is configured by a flexible material.

5. A cell pack according to claim 3, wherein said cylindrical cells are held by a holder which causes said face portions of said terminals on each side of said cylindrical cells to be positioned in a substantially same plane.

6. A cell holder wherein said cell holder comprises a pair of upper and lower plate-like supporting members, a plurality of cell holes of a predetermined depth into which a positive or negative terminal of each of sealed-type cells which are sandwiched between said pair of supporting members is to be fitted are formed in an opposing face of each of said supporting members, a terminal hole elongating to a side opposite to said opposing face is opened in a part of a bottom face of each of said cell holes, and a vent hole elongating from said opposing face to said opposite side is opened at a selected position between said plurality of cell holes.

7. A cell holder wherein said cell holder comprises a pair of upper and lower plate-like supporting members, a plurality of cell holes of a predetermined depth into which a positive or negative terminal of each of sealed-type cells which are sandwiched between said pair of supporting members is to be fitted are formed in an opposing face of each of said supporting members, a terminal hole elongating to a side opposite to said opposing face is opened in a part of a bottom face of each of said cell holes, and a vent groove elongating from said opposing face to said opposite side is formed at an adequate position of an inner peripheral face of each of said plurality of cell holes and terminal holes.

8. A cell holder according to claim 6, wherein a groove elongating from said opposing face to said opposite side is formed at a selected position of a side face of each of said supporting members.

9. A cell holder according to claim 8, wherein terminals which are different in height from each other are disposed at both ends of each of said sealed-type cells, and said cell holes are formed at depths which are different from each other by a difference in height of said terminals in accordance with a polarity.

10. A cell holder according to claim 9, wherein a projection is formed in at least one of a peripheral end portion of a face opposite to said opposing face of each of said supporting members, and a peripheral end portion of said vent hole or vent groove.

11. A cell pack according to claim 5, wherein said cell pack is held by a cell holder comprising a pair of upper and lower plate-like supporting members, a plurality of cell holes of a set depth into which a positive or negative terminal of each of sealed-type cells which are sandwiched between said pair of supporting members is to be fitted are formed in an opposing face of each of said supporting members, a terminal hole elongating to a side opposite to said opposing face is opened in a part of a bottom face of each of said cell holes, and a vent hole elongating from said opposing face to said opposite side is opened at a selected position between said plurality of cell holes.

12. A cell pack wherein a plurality of cylindrical cells according to claim 2 are arranged side-by-side, a connecting member in which bolt holes are opened at both end portions and which is made of an electrically conductive material is used, and bolts are respectively fitted into said both bolt holes of said connecting member and said bolts are fastened to female threaded holes which are opened in face portions of terminals of different cylindrical cells, or male threaded portions erected on face portions of terminals of different cylindrical cells are respectively fitted into said both bolt holes of said connecting member and nuts are respectively fastened to said male threaded portions, or a bolt is fitted into one of said bolt holes of said connecting member and said bolt is fastened to a female threaded hole which is opened in a face portion of a terminal of one of said cylindrical cells and a male threaded portion erected on a face portion of a terminal of another one of cylindrical cells is fitted into the other both bolt hole and a nut is fastened to said male threaded portion, thereby connecting said cylindrical cells with each other.

13. A cell pack according to claim 4, wherein said cylindrical cells are held by a holder which causes said face portions of said terminals on each side of said cylindrical cells to be positioned in a substantially same plane.

14. A cell holder according to claim 7, wherein a groove elongating from said opposing face to said opposite side is formed at an appropriate position of a side face of each of said supporting members.

15. A cell holder according to claim 6, wherein terminals which are different in height from each other are disposed at both ends of each of said sealed-type cells, and said cell holes are formed at depths which are different from each other by a difference in height of said terminals in accordance with a polarity.

16. A cell holder according to claim 7, wherein terminals which are different in height from each other are disposed at both ends of each of said sealed-type cells, and said cell holes are formed at depths which are different from each other by a difference in height of said terminals in accordance with a polarity.

17. A cell holder according to claim 6, wherein a projection is formed in at least one of a peripheral end portion of a face opposite to said opposing face of each of said supporting members, and a peripheral end portion of said vent hole or vent groove.

18. A cell holder according to claim 7, wherein a projection is formed in at least one of a peripheral end portion of a face opposite to said opposing face of each of said supporting members, and a peripheral end portion of said vent hole or vent groove.

19. A cell holder according to claim 8, wherein a projection is formed in at least one of a peripheral end portion of a face opposite to said opposing face of each of said supporting members, and a peripheral end portion of said vent hole or vent groove.

20. A cell pack according to claim 3, wherein said cell pack is held by a cell holder, comprising a pair of upper and lower plate-like supporting members, a plurality of cell holes of a set depth into which a positive or negative terminal of each of sealed-type cells which are sandwiched between said pair of supporting members is to be fitted are formed in an opposing face of each of said supporting members, a terminal hole elongating to a side opposite to said opposing face is opened in a part of a bottom face of each of said cell holes, and a vent hole elongating from said opposing face to said opposite side is opened at a selected position between said plurality of cell holes.

* * * * *